(12) United States Patent
La Fetra et al.

(10) Patent No.: US 6,990,539 B2
(45) Date of Patent: Jan. 24, 2006

(54) APPARATUS AND METHOD OF IMPLEMENTING BREQ ROUTING TO ALLOW FUNCTIONALITY WITH 2 WAY OR 4 WAY PROCESSORS

(75) Inventors: Ross V. La Fetra, Sunnyvale, CA (US); Peter M. Arnold, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 10/122,986

(22) Filed: Apr. 15, 2002

(65) Prior Publication Data

US 2003/0196014 A1 Oct. 16, 2003

(51) Int. Cl.
G06F 13/00 (2006.01)
G06F 13/368 (2006.01)
G06F 13/37 (2006.01)

(52) U.S. Cl. ............ 710/107; 710/119; 710/122; 710/300; 710/301

(58) Field of Classification Search ............ 710/38, 710/51, 301, 303, 107, 119, 122, 316, 242; 712/16; 714/11; 370/217, 359, 362, 388
See application file for complete search history.

(56) References Cited

U.S. PATENT DOCUMENTS

| | | | | | |
|---|---|---|---|---|---|
| 5,134,713 | A | * | 7/1992 | Miller et al. ................... | 712/34 |
| 5,918,023 | A | * | 6/1999 | Reeves et al. ............... | 710/301 |
| 6,041,373 | A | * | 3/2000 | Pham ........................... | 710/62 |
| 6,370,657 | B1 | * | 4/2002 | Jansen et al. ................. | 714/23 |
| 6,470,284 | B1 | * | 10/2002 | Oh et al. ....................... | 702/64 |
| 2001/0004548 | A1 | * | 6/2001 | French ......................... | 438/585 |

OTHER PUBLICATIONS

"Pentium III Xeon Processor at 500 and 550 MHz", Intel Corporation, Feb. 2000. pp. 88-89. Order No. 245095-002.*
Intel Xeon Processor MP, Mar. 2002, pp. 1-116. Retrieved from the internet http://developer.intel.com/design/xeon/datashts/29074001.pdf.
Intel Xeon Processor with 512KB L2 Cache, Jan. 2002, pp. 1-118. Retrieved from the internet http://developer.intel.com/design/xeon/datashts/29864201.pdf.

* cited by examiner

Primary Examiner—Khanh Dang
Assistant Examiner—Thomas J. Cleary

(57) ABSTRACT

An apparatus for implementing bus request routing to allow functionality with 2 way or 4 way processors, includes a bus configured to provide bus request routing; and a bus request route switching stage coupled to the bus and configured to select a first route configuration if two processors are coupled to the bus. The switching stage is also configured to select a second route configuration if more that two processors are coupled to the bus. The switching stage determines if two or more processors are coupled to the bus. A logic block may be used to determine the required configuration based on the detected processor population. A method of changing bus request routing to allow functionality with 2 way or 4 way processors, includes: detecting if a dual processor arrangement or a multi-processor arrangement is coupled to a bus; and selecting a first route configuration if a dual processor arrangement is coupled to the bus and selecting a second route configuration if a multi-processor arrangement is coupled to the bus.

39 Claims, 2 Drawing Sheets

APPARATUS AND METHOD OF IMPLEMENTING BREQ ROUTING TO ALLOW FUNCTIONALITY WITH 2 WAY OR 4 WAY PROCESSORS

TECHNICAL FIELD

The present invention relates generally to the field of microprocessors, and more particularly to an apparatus and method of implementing bus request (BREQ) routing to allow operation of 2 way or 4 way processors.

BACKGROUND

Different configurations are required to support the two central processing unit (CPU) variants, commonly known as the dual processor (DP) and the multi-processor (MP). Additionally, current approaches use a scheme that may not work with future generation CPUs. In particular, current approaches for the bus request (BREQ) routing require a different wiring scheme for the dual processor and for the multi-processor. As a result of these different wiring schemes, two different boards are used to support the dual processor and the multi-processor. The above constraint disadvantageously requires more development efforts for particular products, increases supply chain costs, lowers product flexibility, and/or increases risks.

Therefore, the current approaches and/or technologies are limited to particular capabilities and suffer from various constraints.

SUMMARY

In an embodiment of the present invention, an apparatus for implementing bus request routing to allow functionality with 2-way or 4-way processors, includes a bus configured to provide bus request routing; and a bus request route switching stage coupled to the bus and configured to select a first route configuration if two processors are coupled to the bus. The switching stage is also configured to select a second route configuration if more that two processors are coupled to the bus. The switching stage determines if two or more processors are coupled to the bus. A logic block may be used to determine the required configuration based on the detected processor population.

In another embodiment, a method of changing bus request routing to allow functionality with 2-way or 4-way processors, includes: detecting if a dual processor arrangement or a multi-processor arrangement is coupled to a bus; and selecting a first route configuration if a dual processor arrangement is coupled to the bus and selecting a second route configuration if a multi-processor arrangement is coupled to the bus.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

An embodiment of the invention advantageously permits upgradeability from dual processors to multi-processor capability without having to exchange boards that implement the bus request (BREQ) routing for the processors. This upgradeability feature allows a broader selection of central processing units (CPUs) into a product and allows a significantly lower entry price.

An embodiment of the invention is, for example, implemented in products that are commercially available from Hewlett-Packard Corporation, Palo Alto, Calif., under the product numbers tc6100, tc7100, and rc7100.

As known to those skilled in the art, systems can be (commonly) two-way or four-way. Processors can be dual processor or multi processor variant. Two-way systems, without any modification, can typically accomodate up to two dual processor or multi processor parts.

Figure 1:
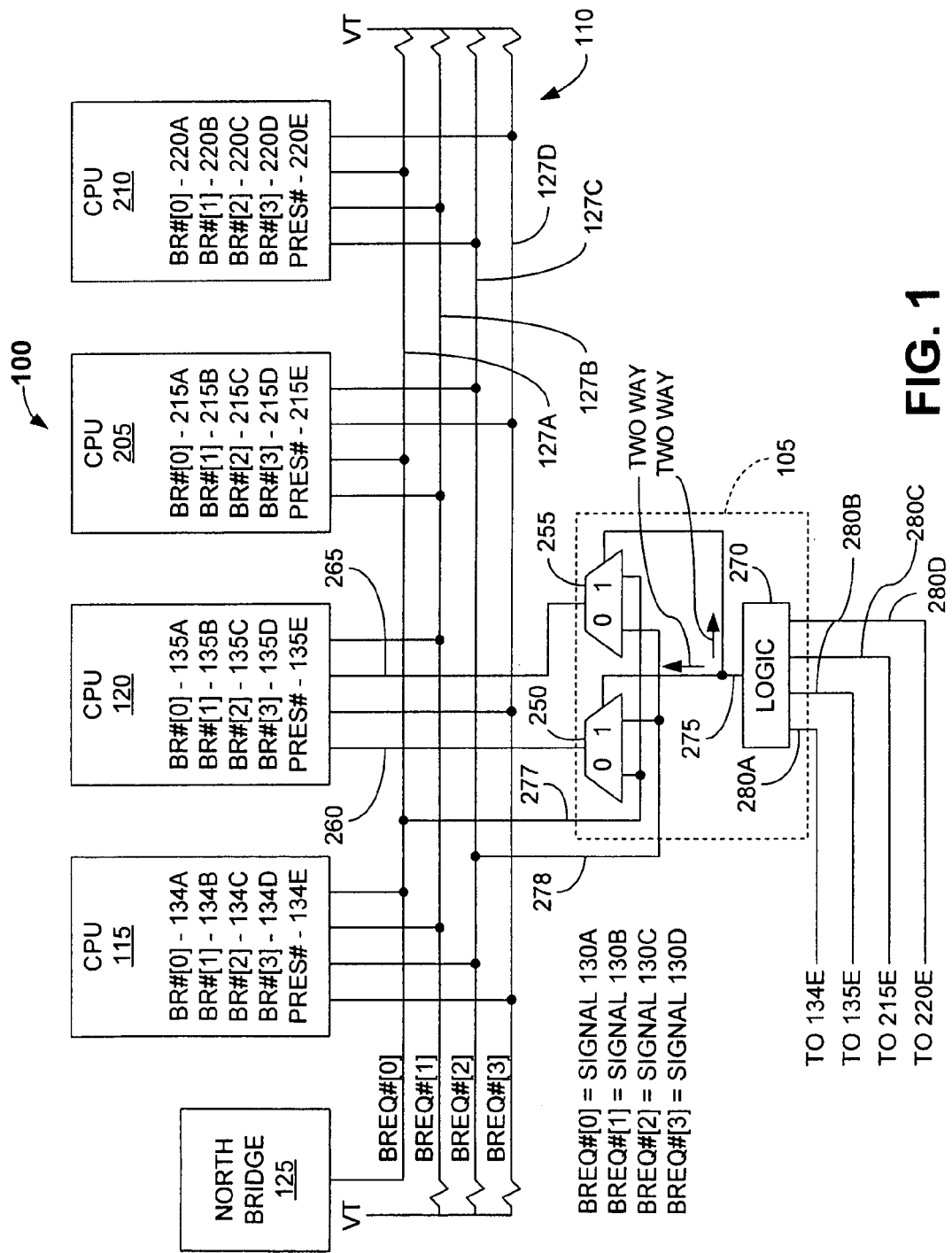
FIG. 1 is a block diagram illustrating an operation of an embodiment of the invention.

FIG. 1 is a block diagram illustrating an operation of an embodiment of the invention in an apparatus 100. The apparatus 100 includes bus request route switching stage 105 that is configured to detect if processors are coupled to a bus 110 and is configured to switch the routing in the bus 110 based upon whether up to two DP or MP processors or more than two MP processors are connected to the bus 110. In the example of FIG. 1, the processors are shown as central processing units (CPUs) 115 and 120, although other types of suitable bus agents may be used. The CPUs 115 and 120 are shown in a dual processor arrangement in FIG. 1. Typically, the CPUs 205 and 210 can also be coupled to the bus 110, so that the CPUs 205, 210, 115, and 120 form a multi-processor arrangement. Additional details on processors can be found in the following three listed references that are hereby fully incorporated herein by reference: (1) Tom Shanley, PENTIUM PRO PROCESSOR SYSTEM ARCHITECTURE, MINDSHARE, INC., (2) Datasheet for INTEL XEON Processor with 512 KB L2 Cache at 1.80 GHz, 2 GHz, and 2.20 GHz, <http://developer.intel.com/design/xeon/datashts/29864201.p df>, and/or (3) Datasheet for INTEL XEON Processor MP at 1.40 GHz, 1.50 GHz, and 1.60 GHz, <http://developer.intel.com/design/xeon/datashts/29074001.p df>.

A northbridge chip 125 (or other chip set) may also be connected to the bus 110. A northbridge chip is typically a circuit in a computer chip which connects the CPU to the system memory, accelerated graphics port (AGP), and peripheral connect interface busses. The northbridge chip 125 is typically in contact with the lines of bus 110 during initialization.

The bus 110 may include bus lines 127A, 127B, 127C, and 127D for transmitting bus request signals 130A, 130B, 130C, and 130D, respectively. For purposes of clarity, the bus request signals 130A, 130B, 130C, and 130D are also referred to below as BREQ#[0], BREQ#[1], BREQ#[2], and BREQ#[3], respectively. Each of the CPUs 115 and 120 includes pins that are generally referred to as BR#[0], BR#[1], BR#[2], BR#[3], and PRES#. For purposes of clarity, each of the pins BR#[0], BR#[1], BR#[2], BR#[3], and PRES# are assigned different reference numbers for each CPU. Thus, for CPU 115, the pins BR#[0], BR#[1], BR#[2], BR#[3], and PRES# are referenced as pins 134A, 134B, 134C, 134D, and 134E, respectively. For CPU 120, the pins BR#[0], BR#[1], BR#[2], BR#[3], and PRES# are referenced as pins 135A, 135B, 135C, 135D, and 135E, respectively. For CPU 205, the pins BR#[0], BR#[1], BR#[2], BR#[3], and PRES# are referenced as pins 215A, 215B, 215C, 215D, and 215E, respectively. For CPU 210, the pins BR#[0], BR#[1], BR#[2], BR#[3], and PRES# are referenced as pins 220A, 220B, 220C, 220D, and 220E, respectively.

In one embodiment, the switching stage 105 includes a pair of two-input multiplexers 250 and 255. However, other elements with short delay properties may instead be used as elements for the switching stage 105. For example, the multiplexers 250 and 255 may instead be a micro-relay(s) with a short propagation delay.

In one embodiment, a logic stage 270 has inputs 280A, 280B, 280C, and 280D that can sense the presence of PRES# pins 134E, 135E, 215E, 220E, respectively. The logic stage 270 may be internal or external to the defined switching stage 105. In a dual processor arrangement, the CPUs 205 and 210 will not be coupled to the bus 110. For the dual processor arrangement, the logic block 270 will output a high signal via output line 275, named "TWOWAY". This signal via output line 275 controls the multiplexers 250 and 255. The high TWOWAY signal causes the multiplexer 255 to pass the signal in line 277 as the output signal via output line 265. In this case, the BREQ#[0] signal in bus line 127A will pass along line 277 and will be passed by the multiplexer 255, via line 265, to the pin BR#[1] (135B) of the CPU 120.

The switching stage 105 may be implemented, for example, discretely or in logic circuitry.

The BR#[2] and BR#[3] pins (134C and 134D) in the CPU 115 and the BR#[2] and BR#[3] pins (135C and 135D) in the CPU 120 remain tied high by pullup resistors.

Thus, in the dual processor configuration, in response to the high TWOWAY signal (or TWOWAY signal in a first state) from the logic stage 270, the multiplexers 255/250 will route the BREQ signals such that the required connectivity for a two-way dual processor system is achieved per the following Table 1. The pin/signal connections in Table 1 is the two way BREQ#[3:0] rotation scheme (known as "swizzling" in the above-referenced Intel datasheet documentation) that is recommended by Intel Corporation, Santa Clara Calif.

TABLE 1

| Pin | Cpu 115 | CPU 120 |
| --- | --- | --- |
| BR#[0] | BREQ#[0] | BREQ#[1] |
| BR#[1] | BREQ#[1] | BREQ#[0] |
| BR#[2] | Tie high | tie high |
| BR#[3] | Tie high | tie high |

In a multi processor arrangement, the CPUs 205 and/or 210 will be coupled to the bus 110. For the multi processor arrangement, the logic block 270 will output a low TWOWAY signal via output line 275. The low TWOWAY signal causes the multiplexer 255 to pass the signal in line 278 as the output signal via output line 265. In this case, the BREQ#[2] signal in bus line 127C will pass along line 278 and will be passed by the multiplexer 255, via line 265, to the pin BR#[1] (135B) of the CPU 120.

The low TWOWAY signal also causes the multiplexer 250 to pass the signal in line 277 as the output signal via output line 260. In this case, the BREQ#[0] signal in bus line 127A will pass along line 277 and will be passed by the multiplexer 250, via line 260, to the pin BR#[3] (135D) of the CPU 120.

For the CPU 115, the pins BR#[0] (134A), BR#[1] (134B), BR#[2] (134C), and BR#[3] (134D) will be connected to the bus lines 127A, 127B, 127C, and 127D, respectively. Thus, the pins BR#[0] (134A), BR#[1] (134B), BR#[2] (134C), and BR#[3] (134D) receive the signals BREQ#[0], BREQ#[1], BREQ#[2], and BREQ#[3], respectively.

For the CPU 205, the pins BR#[0] (215A), BR#[1] (215B), BR#[2] (215C), and BR#[3] (215D) will be connected to the bus lines 127C, 127D, 127A, and 127B, respectively. Thus, the pins BR#[0] (215A), BR#[1] (215B), BR#[2] (215C), and BR#[3] (215D) receive the signals BREQ#[2], BREQ#[3], BREQ#[0], and BREQ#[1], respectively.

For the CPU 210, the pins BR#[0] (220A), BR#[1] (220B), BR#[2] (220C), and BR#[3] (220D) will be connected to the bus lines 127D, 127A, 127B, and 127C, respectively. Thus, the pins BR#[0] (220A), BR#[1] (220B), BR#[2] (220C), and BR#[3] (220D) receive the signals BREQ#[3], BREQ#[0], BREQ#[1], and BREQ#[2], respectively.

Thus, in the multi processor configuration, in response to the low TWOWAY signal (or TWOWAY signal in a second state) from the logic stage 270, the multiplexers 255/250 will route the BREQ signals such that the required connectivity for a 3-way or 4-way multi processor system is achieved per the following Table 2. The pin/signal connections in Table 2 is the four way BREQ#[3:0] rotation scheme (known as "swizzling" in the above-referenced Intel datasheet documentation) that is recommended by Intel Corporation.

TABLE 2

| Pin | CPU 115 | CPU 120 | CPU 205 | CPU 210 |
| --- | --- | --- | --- | --- |
| BR#[0] | BREQ#[0] | BREQ#[1] | BREQ#[2] | BREQ#[3] |
| BR#[1] | BREQ#[1] | BREQ#[2] | BREQ#[3] | BREQ#[0] |
| BR#[2] | BREQ#[2] | BREQ#[3] | BREQ#[0] | BREQ#[1] |
| BR#[3] | BREQ#[3] | BREQ#[0] | BREQ#[1] | BREQ#[2] |

The switching stage 105 can, therefore, detect the presence of a third CPU (CPU 205 and/or CPU 210 in the example of FIG. 2) and re-configure the routing in the bus 110 so that the routing configuration of Table 1 is re-arranged to the routing configuration of Table 2. The switching stage 105 re-configures the routing by electrical control via multiplexers 250 and 255. The switching stage 105 can also detect the absence of a third CPU (CPU 205 or 210 in the example of FIG. 2) and re-configure the routing in the bus 110 so that the routing configuration of Table 2 is re-arranged to the routing configuration of Table 1.

Figure 2:
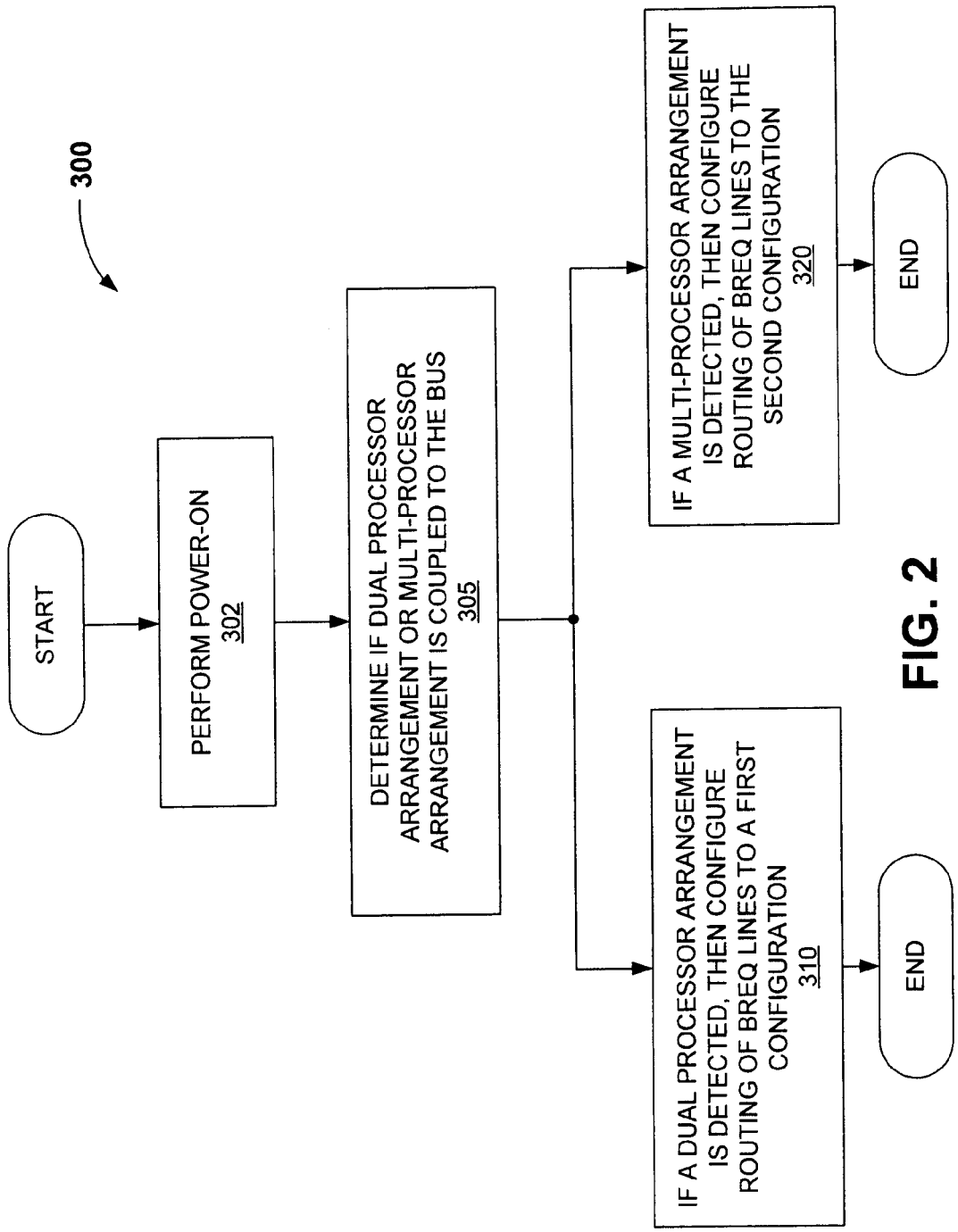
FIG. 2 is a flowchart illustrating a method of implementing BREQ routing to allow functionality with 2 way or 4 way processors, in accordance with an embodiment of the invention.

It is noted that in FIGS. 1 and 2, the line 127A (with the BREQ#[0] signal) is preferably not switched, since the line 127A typically is longer in length and does not have the same timing margins as the lines 127B–127D. While we describe switching BREQ#[0] and BREQ#[2] on CPU 120 here, it is preferable for the above reason to switch BREQ#[1] and BREQ#[3] on CPU 115 instead, and reverse the rotation scheme for the same effect.

It is also noted that the switching of the input pins BR#[0] to BR#[3] with the BREQ#[0] to BREQ#[3] signals is performed on CPU 120 in FIGS. 1 and 2. However, the switching of the input pins BR#[0] to BR#[3] with the BREQ#[0] to BREQ#[3] signals can instead be performed on CPU 115. In this case, the switching circuitry and connections in FIG. 2 may require modification in a manner known to those skilled in the art, in order to switch the routing configuration shown in Table 1 to the routing configuration shown in Table 2 above.

It is also noted that the first two sockets in a board that implements an embodiment of the invention are used for the dual processor arrangement. These first two sockets will receive the CPU 115 and CPU 120. When a third CPU is inserted in another socket, then the switching stage 105 can determine that a multi-processor arrangement has been put in place.

It is also noted that the pin PRES# (220E) of CPU 210 may be configured for connection to the input of logic stage 270. The PRES# pin is internally shorted to ground on the CPU. Thus, when the CPU 210 is inserted into a socket on the board, the switching stage 105 can determine that a multi-processor arrangement has been put in place.

FIG. 2 is a flowchart illustrating a method 300 of implementing BREQ routing to allow functionality with 2 way or 4 way processors, in accordance with a specific embodiment of the invention. A power-on of a system implementing an embodiment of the invention is first performed (302). The switching stage first detects or determines (305) if a dual processor arrangement or multi-processor arrangement is present on a bus. If a dual processor arrangement is detected, the switching stage configures (310) the routing of the bus requests lines into a first configuration as shown in Table 1 above. If a multi-processor arrangement is detected in action (305), then the switching stage configures (320) the routing of bus requests lines into the second configuration. The circuitry in logic stage 270 and 250/255 is designed to effect the re-configuration of bus requests fast enough that the operation is complete before the processors can emerge from their reset state.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for implementing bus request routing to allow functionality with 2 way or 4 way processors, the apparatus comprising:
   a bus configured to provide bus request routing, wherein the bus comprises a first bus line, a second bus line, a third bus line, and a fourth bus line; and
   a bus request route switching stage coupled to the bus and configured to select a first route configuration if one or two processors are coupled to the bus, the switching stage configured to select a second route configuration if more that two processors are coupled to the bus;
   wherein the bus request route switching stage includes a first switching element, a second switching element, and a logic stage coupled to the first and second switching elements, wherein the logic stage is configured to detect if one or two processors are coupled to the bus or if more than two processors are coupled to the bus, wherein the logic stage is configured to generate a control signal that permits the switching elements to perform switching of bus request signals that are received by one of the processors coupled to the bus, and wherein a value of the control signal is determined by a number of processors coupled to the bus;
   wherein the logic stage outputs the control signal with a first value if one or two processors are coupled to the bus, and wherein the control signal with the first value causes the second switching element to pass a BREQ#[0] signal from the first bus line to a BR#[1] pin of a second processor, if two processors are coupled to the bus;

wherein the logic stage outputs the control signal with a second value if more than two processors are coupled to the bus, wherein the control signal with the second value causes the second switching element to pass a BREQ#[2] signal from the third bus line to the BR#[1] pin of the second processor, and wherein the control signal with the second value causes the first switching element to pass the BREQ#[0] signal from the first bus line to a BR#[3] pin of the second processor, if more than two processors are coupled to the bus.

2. The apparatus of claim 1, wherein the first switching element in the bus request route switching stage comprises a first multiplexer configured to select the route configuration;

wherein the second switching element in the bus request route switching stage comprises a second multiplexer configured to select the route configuration; and wherein the logic stage is configured to generate the control signal that permits the multiplexers to select the route configuration.

3. The apparatus of claim 2, wherein the logic stage detects a presence of a processor by being coupled to a presence pin of the processor.

4. The apparatus of claim 1, wherein the switching stage is implemented in discrete form.

5. The apparatus of claim 1, wherein the switching stage is implemented in a logic circuit.

6. The apparatus of claim 1, wherein the bus comprises a plurality of bus lines including a first bus line, a second bus line, a third bus line, and a fourth bus line;

wherein the switching stage selects at least one of the bus lines to select the route configuration.

7. The apparatus of claim 6, wherein the first configuration comprises a formed routing path from an input pin of one of the processors to the first bus line.

8. The apparatus of claim 6, wherein the second configuration comprises a formed routing path from an input pin of one of the processors to the third bus line and a formed routing path from another input pin of the one of the processors to the first bus line.

9. The apparatus of claim 6, wherein the one of the processors includes a BR#[1] pin and a BR#[3] pin, wherein the first switching element permits the BR#[1] pin to receive a BREQ#[0] bus request signal in the first bus line when one or two processors are coupled to the bus, and wherein the second switching element permits the BR#[3] pin to receive a high logic level value in the third bus line when one or two processors are coupled to the bus.

10. The apparatus of claim 6, wherein the one of the processors includes a BR#[1] pin and a BR#[3] pin, wherein the first switching element permits the BR#[1] pin to receive a BREQ#[2] bus request signal in the third bus line when more than two processors are coupled to the bus, and wherein the second switching element permits the BR#[3] pin to receive a BREQ#[0] bus request signal in the first bus line when more than two processors are coupled to the bus.

11. The apparatus of claim 1, wherein the switching elements comprise micro-relays.

12. The apparatus of claim 1, wherein the control signal has a value in a first state when one or two processors are coupled to the bus, and wherein the control signal has a value in a second state when more than two processors are coupled to the bus.

13. The apparatus of claim 1, wherein the logic stage receives a ground level signal from a presence pin of a processor, if the processor is coupled to the bus.

14. The apparatus of claim 1, wherein the first processor includes a BR#[0] pin that receives the BREQ#[0] signal from the first bus line, a BR#[1] pin that receives a BREQ#[1] signal from the second bus line, a BR#[2] pin that is tied high, and a BR#[3] pin that is tied high, and wherein the second processor includes a BR#[0] pin that receives a BREQ#[1] signal from the second bus line, a BR#[2] pin that is tied high, and a BR#[3] pin that is tied high, if two processors are coupled to the bus.

15. The apparatus of claim 1, wherein the first processor includes a BR#[0] pin that receives the BREQ#[0] signal from the first bus line, a BR#[1] pin that receives a BREQ#[1] signal from the second bus line, a BR#[2] pin that receives a BREQ#[2] signal from the third bus line, and a BR#[3] pin that receives a BREQ#[3] signal from the fourth bus line, and wherein the second processor includes a BR#[0] pin that receives the BREQ#[1] signal from the second bus line, and a BR#[2] pin that receives the BREQ#[3] signal from the fourth bus line, if more than two processors are coupled to the bus.

16. An apparatus for implementing bus request routing to allow functionality with 2 way or 4 way processors, the apparatus comprising:

a bus request route switching stage coupled to a bus and configured to select a first route configuration if a dual processor arrangement is coupled to the bus, the switching stage configured to select a second route configuration if a multi-processor arrangement is coupled to the bus, wherein a dual processor arrangement has two processors coupled to the bus, and wherein a multi-processor arrangement has more than two processors coupled to the bus;

wherein the bus request route switching stage includes a first switching element, a second switching element, and a logic stage coupled to the first and second switching elements, wherein the logic stage is configured to detect if one or two processors are coupled to the bus or if more than two processors are coupled to the bus, wherein the logic stage is configured to generate a control signal that permits the switching elements to perform switching of bus request signals that are received by one of the processors coupled to the bus, and wherein a value of the control signal is determined by a number of processors coupled to the bus;

wherein the bus comprises a first bus line, a second bus line, a third bus line, and a fourth bus line;

wherein the logic stage outputs the control signal with a first value if one or two processors are coupled to the bus, and wherein the control signal with the first value causes the second switching element to pass a BREQ#[0] signal from the first bus line to a BR#[1] pin of a second processor, if two processors are coupled to the bus;

wherein the logic stage outputs the control signal with a second value if more than two processors are coupled to the bus, wherein the control signal with the second value causes the second switching element to pass a BREQ#[2] signal from the third bus line to the BR#[1] pin of the second processor, and wherein the control signal with the second value causes the first switching element to pass the BREQ#[0] signal from the first bus line to a BR#[3] pin of the second processor, if more than two processors are coupled to the bus.

17. The apparatus of claim 16, wherein the first switching element in the bus request route switching stage comprises:
a first multiplexer configured to select the route configuration;
wherein the second switching element in the bus request route switching stage comprises a second multiplexer configured to select the route configuration; and
wherein the logic stage is configured to generate the control signal that permits the multiplexers to select the route configuration.

18. The apparatus of claim 17, wherein the logic stage detects a presence of a processor by being coupled to a presence pin of the processor.

19. The apparatus of claim 16, wherein the switching stage is implemented in discrete form.

20. The apparatus of claim 16, wherein the switching stage is implemented in a logic circuit.

21. The apparatus of claim 16, wherein the bus comprises a plurality of bus lines including a first bus line, a second bus line, a third bus line, and a fourth bus line;
wherein the switching stage selects at least one of the bus lines to select the route configuration.

22. The apparatus of claim 21, wherein the first configuration comprises a formed routing path from an input pin of one of the processors to the first bus line.

23. The apparatus of claim 21, wherein the second configuration comprises a formed routing path from an input pin of one of the processors to the third bus line and a formed routing path from another input pin of the one of the processors to the first bus line.

24. The apparatus of claim 21, wherein the one of the processors includes a BR#[1] pin and a BR#[3] pin, wherein the first switching element permits the BR#[1] pin to receive a BREQ#[0] bus request signal in the first bus line when one or two processors are coupled to the bus, and wherein the second switching element permits the BR#[3] pin to receive a high logic level value in the third bus line when one or two processors are coupled to the bus.

25. The apparatus of claim 21, wherein the one of the processors includes a BR#[1] pin and a BR#[3] pin, wherein the first switching element permits the BR#[1] pin to receive a BREQ#[2] bus request signal in the third bus line when more than two processors are coupled to the bus, and wherein the second switching element permits the BR#[3] pin to receive a BREQ#[0] bus request signal in the first bus line when more than two processors are coupled to the bus.

26. The apparatus of claim 16, wherein the switching elements comprise micro-relays.

27. The apparatus of claim 16, wherein the control signal has a value in a first state when one or two processors are coupled to the bus, and wherein the control signal has a value in a second state when more than two processors are coupled to the bus.

28. The apparatus of claim 16, wherein the logic stage receives a ground level signal from a presence pin of a processor, if the processor is coupled to the bus.

29. A method of changing bus request routing to allow functionality with 2 way or 4 way processors, the apparatus comprising:
detecting if a dual processor arrangement or a multi-processor arrangement is coupled to a bus, wherein a dual processor arrangement has two processors coupled to the bus, and wherein a multiprocessor arrangement has more than two processors coupled to the bus; and
selecting a first route configuration using first and second switching elements if a dual processor arrangement is coupled to the bus and selecting a second route configuration using first and second switching elements if a multi-processor arrangement is coupled to the bus, wherein the act of selecting includes generating a control signal by a logic stage that permits switching of bus request signals that are received by a processor coupled to the bus, and wherein a value of the control signal is determined by a number of processors coupled to the bus;
wherein the bus comprises a first bus line, a second bus line, a third bus line, and a fourth bus line;
wherein the logic stage outputs the control signal with a first value if one or two processors are coupled to the bus, and wherein the control signal with the first value causes the second switching element to pass a BREQ#[0] signal from the first bus line to a BR#[1] pin of a second processor, if two processors are coupled to the bus;
wherein the logic stage outputs the control signal with a second value if more than two processors are coupled to the bus, wherein the control signal with the second value causes the second switching element to pass a BREQ#[2] signal from the third bus line to the BR#[1] pin of the second processor, and wherein the control signal with the second value causes the first switching element to pass the BREQ#[0] signal from the first bus line to a BR#[3] pin of the second processor, if more than two processors are coupled to the bus.

30. The method of claim 29, wherein each switching element comprises:
a multiplexer configured to select the route configuration; and
wherein the logic stage is configured to generate the control signal that permits the multiplexer to select the route configuration.

31. The method of claim 29, wherein the first route configuration is formed by forming a routing path from an input pin of one of the processors to a first bus line.

32. The method of claim 29, wherein the second configuration is formed by forming a routing path from an input pin of one of the processors to a third bus line and by forming a routing path from another input pin of the one of the processors to a first bus line.

33. The method of claim 29, wherein the switching elements comprise micro-relays.

34. The method of claim 29, wherein the bus includes a first bus line, a second bus line, a third bus line, and a fourth bus line, wherein the switching elements includes a first switching element and a second switching element, wherein the processor includes a BR#[1] pin and a BR#[3] pin, wherein the first switching element permits the BR#[1] pin to receive a BREQ#[0] bus request signal in the first bus line when one or two processors are coupled to the bus, and wherein the second switching element permits the BR#[3] pin to receive a high logic level value in the third bus line when one or two processors are coupled to the bus.

35. The method of claim 29, wherein the bus includes a first bus line, a second bus line, a third bus line, and a fourth bus line, wherein the switching elements includes a first switching element and a second switching element, wherein the processor includes a BR#[1] pin and a BR#[3] pin, wherein the first switching element permits the BR#[1] pin to receive a BREQ#[2] bus request signal in the third bus line when more than two processors are coupled to the bus, and wherein the second switching element permits the BR#[3] pin to receive a BREQ#[0] bus request signal in the first bus line when more than two processors are coupled to the bus.

36. The method of claim 29, further comprising:
receiving, by a logic stage, a ground level signal from a presence pin of the processor, if the processor is coupled to the bus.

37. The method of claim 29, wherein the first processor includes a BR#[0] pin that receives the BREQ#[0] signal from the first bus line, a BR#[1] pin that receives a BREQ#[1] signal from the second bus line, a BR#[2] pin that is tied high, and a BR#[3] pin that is tied high, and wherein the second processor includes a BR#[0] pin that receives a BREQ#[1] signal from the second bus line, a BR#[2] pin that is tied high, and a BR#[3] pin that is tied high, if two processors are coupled to the bus.

38. The method of claim 29, wherein the first processor includes a BR#[0] pin that receives the BREQ#[0] signal from the first bus line, a BR#[1] pin that receives a BREQ#[1] signal from the second bus line, a BR#[2] pin that receives a BREQ#[2] signal from the third bus line, and a BR#[3] pin that receives a BREQ#[3] signal from the fourth bus line, and wherein the second processor includes a BR#[0] pin that receives the BREQ#[1] signal from the second bus line, and a BR#[2] pin that receives the BREQ#[3] signal from the fourth bus line, if more than two processors are coupled to the bus.

39. An apparatus for changing bus request routing to allow functionality with 2 way or 4 way processors, the apparatus comprising:
means for detecting if a dual processor arrangement or a multiprocessor arrangement is coupled to a bus, wherein the bus comprises a first bus line, a second bus line, a third bus line, and a fourth bus line, wherein a dual processor arrangement has two processors coupled to the bus, and wherein a multiprocessor arrangement has more than two processors coupled to the bus; and
coupled to the detecting means, means for selecting a first route configuration if a dual processor arrangement is coupled to the bus and for selecting a second route configuration if a multi-processor arrangement is coupled to the bus, wherein the selecting means comprises means for generating a control signal that permits switching of bus request signals that are received by a processor coupled to the bus, and wherein a value of the control signal is determined by a number of processors coupled to the bus;
wherein the selecting means outputs the control signal with a first value if one or two processors are coupled to the bus, and wherein the control signal with the first value causes a second switching element to pass a BREQ#[0] signal from the first bus line to a BR#[1] pin of a second processor, if two processors are coupled to the bus;
wherein the selecting means outputs the control signal with a second value if more than two processors are coupled to the bus, wherein the control signal with the second value causes the second switching element to pass a BREQ#[2] signal from the third bus line to the BR#[1] pin of the second processor, and wherein the control signal with the second value causes a first switching element to pass the BREQ#[0] signal from the first bus line to a BR#[3] pin of the second processor, if more than two processors are coupled to the bus.

* * * * *